ably extends toward the threaded end of the shank so that

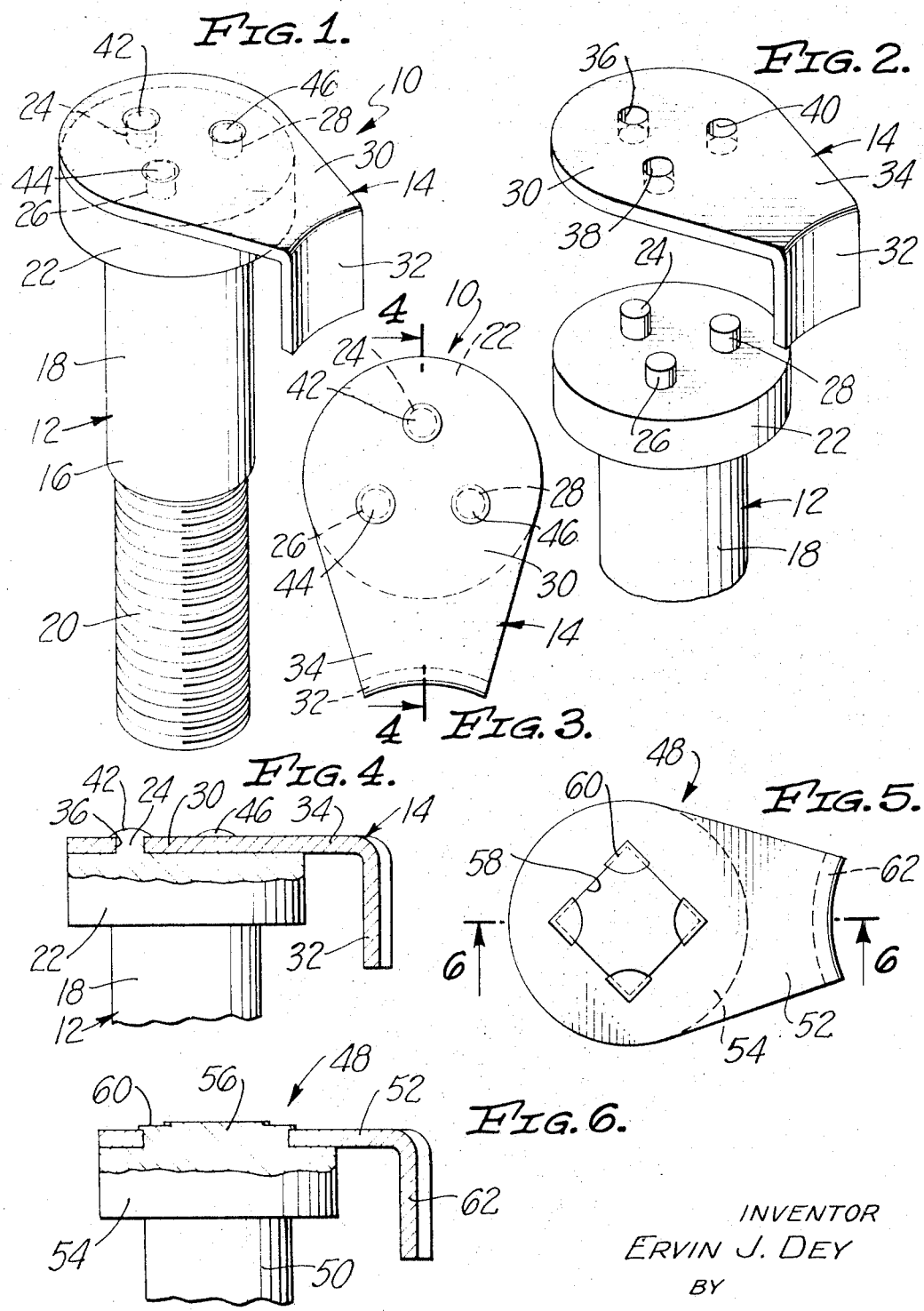

United States Patent Office 3,451,456
Patented June 24, 1969

3,451,456
BOLT WITH RESTRAINER
Ervin J. Dey, Santa Fe Springs, Calif., assignor to Standard Pressed Steel Co., Santa Ana, Calif., a corporation of Pennsylvania
Filed Apr. 26, 1967, Ser. No. 633,846
Int. Cl. F16b 39/02
U.S. Cl. 151—68                                   8 Claims

ABSTRACT OF THE DISCLOSURE

In order to restrain the rotation of the bolt, a restrainer is fixedly secured to the bolt head. When the bolt is headed, at least one rivet shank is formed to upstand on the bolt head. After the bolt is otherwise finished, a restrainer is mounted on the bolt head over his rivet shank, which is then headed down over the restrainer to retain the restrainer in place. The shape of the rivet shank, or preferably the pattern of the several rivet shanks, is such as to restrain the restrainer from rotating with respect to the bolt axis. The restrainer has engagement means on it to engage upon a member through which the bolt is inserted to thus restrain rotation of the bolt with respect to the member.

Background

This invention is directed to a bolt, and particularly to a bolt with restrainer which prevents the bolt from rotating upon installation and removal. The restrainer is secured onto the bolt head and engages upon a member through which the bolt is inserted. Thus, bolt rotation with respect to the workpiece is restrained. The engagement is either in an adjacent hole, slot or over the edge of the part through which the bolt is inserted. There has long been need for restraining the rotation of a bolt. A number of unsophisticated ways for accomplishing this are known, including the ordinary stove bolt. For high performance installations, a square shanked portion on the bolt is unsatisfactory, for fits of reasonable accuracy cannot be made. Lock washers and other under-the-head devices introduce a variable beneath the head so that the squareness of the head with respect to the shank cannot be assured in the highest performance applications. Lock washers cannot be relied upon to restrain rotation where one has no other control over the bolt shank. They simply aid in preventing vibration from shaking them loose. Furthermore, lock washers usually have teeth which engage in the adjacent metal faces, and such is not permissable in high stress applications. Other types of fastening means do not permit easy removability of the bolt when access to the bolt head is available. Some securing means such as the passing of wires through holes in the bolt heads only restrain the bolt after it is fully tightened to prevent it from shaking loose from vibration, and are not sufficiently strong to restrain the bolt head when tightening torque is applied. Thus, they aren't satisfactory for blind applications where the bolt must be restrained from rotation and only the threaded shank is accessible to the mechanic.

Summary

This invention is directed to a bolt with a restrainer. The restrainer is fixedly secured to the bolt and forms an integral part thereof. The restrainer is secured on the top of the bolt head. During the heading process of bolt manufacture, at least one rivet shank is formed on the head as an integral part thereof. After the finishing operations upon the bolt, the restrainer is placed over this shank and the shank is then riveted over the top of the restrainer. The shank is either nonround to prevent rotation of the restrainer with respect to the bolt head, or preferably several of such shanks are provided. The restrainer is installed over these shanks and they are riveted down to hold the restrainer firmly in place in nonrotative relationship to the bolt shank. The restrainer is formed in such a manner that a portion of it extends generally parallel to the bolt shank, and the parallel portion preferit can engage over the edge of, or in a hole or slot in the piece through which the bolt is installed. By this means, the bolt with restrainer of this invention is nonrotatively held with respect to the piece so that nuts can be installed upon and removed from the threaded portion of the bolt.

It is an object of this invention to provide a bolt having a restrainer so that the bolt is secured from rotation when a nut is installed thereon and the nut is turned on the bolt. It is another object of this invention to provide a bolt with a restrainer to secure the bolt against rotation, which restrainer is relatively low and does not add appreciably to the head height of the bolt. It is a further object of this invention to provide a restrainer which is riveted onto the head of the bolt, the rivets being integrally formed with the bolt head so that the bolt head is not weakened and the restrainer is secured upon the bolt head with maximum strength both axially and rotatively. It is a further object of this invention to provide a bolt which has a restrainer riveted onto the upper surface of the bolt head, so that the under surface of the bolt head can be accurately machined and accurately lie against the part through which the bolt passes. It is another object to provide a bolt with a rotative restrainer wherein the restrainer is riveted onto the bolt head by means of three rivets, the rivets being integrally formed with the bolt head, the rivets being spaced apart to provide maximum strength for holding the restrainer upon the bolt head. Other objects and advantages of this invention will become apparent from a study of the following portion of this specification, the claims and the attached drawings.

Description of the drawings

FIG. 1 is an isometric view of the bolt with restrainer in accordance with this invention.

FIG. 2 is an exploded isometric view showing the restrainer in position to be installed upon the bolt head, with parts broken away.

FIG. 3 is a top plan view of the bolt with restrainer of FIG. 1.

FIG. 4 is a partial section taken generally along the line 4—4 of FIG. 3 with parts broken away.

FIG. 5 is a top plan view of another embodiment of the bolt with restrainer of this invention.

FIG. 6 is a partial section taken generally along the line 6—6 of FIG. 5, with parts broken away.

Description

The preferred embodiment of the bolt with restrainer in accordance with this invention is generally indicated at 10. The bolt with restrainer is made up of bolt 12 and restrainer 14. The bolt 12 has a shank 16 which in turn is made up of a cylindrical section 18 and a threaded section 20. These sections are produced in accordance with the required standards so that the bolt 12 can be used in conventional manner by the installation of a nut upon threaded section 20 to hold one or more pieces between the nut and head 22.

In accordance with conventional bolt making practice, head 22 is formed on the bolt by means of malleably forging or heading stock of suitable size to deform shank stock in such a manner that it is rough formed into a head. In some cases, such headed bolts are then in condition for threading and subsequent use. However, the preferred use of the bolt with restrainer generally indicated at 10 is in high precision applications. In such applications, further finishing of both the head and shank is usually required. This further finishing may include turning, heat treating and grinding. Sometimes plating is also required. The bolt with restrainer 10 is particularly intended for high precision applications, so that the head 22, threaded section 20 and cylindrical section 18 are carefully finished to close tolerances.

During the heading operation, three rivet shanks are formed upstanding from the top of the head and with axes parallel to the axis of the remainder of bolt 12. These three rivet shanks are indicated at 24, 26 and 28. The rivet shanks are preferably equally spaced around the axis of the bolt, and thus are spaced 120° from each other around the axis. This arrangement is for ease of fabrication by eliminating the need for orientation, and even load distribution.

Restrainer 14 comprises panel 30 and leg 32. Panel 30 is substantially planar and just thick enough to obtain the strength desired. Restrainer 14 may be of the same metallic alloy as bolt 12 or may be of a different alloy, depending upon requirements. Panel 30 throughout most of its circumference has the same diameter as head 22 so that when it is installed upon head 22, as is illustrated in FIGS. 1, 3 and 4, the outer surfaces lie generally in the same cylindrical position. Arm 34 is a portion of panel 30 and extends away from the axis of the bolt. Leg 32 is formed on the end of arm 34. Arm 34 is sufficiently long so as to place leg 32 at the desired position or radius away from the bolt axis. Leg 32 is formed on the end of arm 34 by bending, and leg 32 preferably forms a portion of a tubular cylinder with its concavity in the outward direction. The tubular cylinder of leg 32 has an outer diameter which preferably has a radius substantially equal to the diameter of shank 16. Rivet holes 36, 38 and 40 are formed in panel 30. The holes are located in the same manner as the previously described respective rivet shanks 24, 26 and 28 so that restrainer 14 can be placed down against the top of head 22 with the rivet shanks passing through the rivet holes. When so positioned, all three rivets are riveted over, as is illustrated in FIGS. 1, 3 and 4, so that mushrooms 42, 44 and 46 are formed from the protruding rivet shanks to engage over the top of panel 30 outside of their respective holes, in conventional riveting manner.

It is to be noted that arm 34 extends outward with its center line passing substantially directly from the axis half way between the holes 38 and 40 and the rivet shanks 26 and 38 therein. These rivet shanks are 120° apart with respect to the axis and and are thus 60° on each side of the centerline. This provides more hold-down force on the side with arm 34, and the placement of the three rivet shanks provides the maximum balance of forces between rotary restraint and hold down.

Leg 32 has curvature for two reasons. First, it gives it more strength so that it has less tendency to bend, and second, with such curvature it accurately fits against the outer surface of a hole which has been appropriately placed and sized to receive it. Thus, the bolt with restrainer can restrain the bolt 12 against rotation either by having the leg 32 extend over the edge of the piece through which the bolt is installed, or it can be placed in an appropriate adjacent hole for the same rotary restraint of the bolt.

The bolt with restrainer 10 is particularly suitable for those applications wherein the bolt head cannot be reached because assembly around the bolt head area has proceeded, but the assembly of further parts on the bolt shank or the nut on the bolt shank cannot yet be carried forth. Thus, even though the head cannot be reached, it is firmly restrained against rotation with sufficient rigidity that a nut can be firmly pulled up upon threads 20 without concern for the undesired rotation of the bolt.

The embodiment illustrated in FIGS. 1 through 4 is preferred, because the upstanding rivets formed integrally with the shank provide fastening means without any weakening of the head. In less highly stressed or high performance fasteners, holes can be drilled in the head and into these holes can be driven headed pins to hold the restrainer in place. In this case the pins have their heads on the top of the restrainer, pass down through the holes in the restrainer and are driven into the holes in the bolt head. In this alternative structure the pins are separate parts secured into the bolt head rather than integrally formed therewith.

The structure of FIGS. 1 through 4 is the preferred embodiment because the placement of the rivet shanks 24 through 28 provide the most ideal retention of the restrainer 14 upon the bolt 12, but in other applications a structure such as shown in FIGS. 5 and 6 may be equally suitable. These figures illustrate another embodiment of a bolt with a restrainer, generally indicated at 48. In these figures the bolt is indicated at 50 and the restrainer at 52. Bolt 50 is similar to bolt 12 in that it has a shank with a cylindrical section and a threaded section. When head 54 is formed by the conventional malleable heading operation, it is formed with an upstanding rivet shank 56 which extends above the top of the head. Again, the rivet shank is integrally formed in a forging-like operation so that the metallic flow lines are of optimum condition for maximum strength, and the rivet shank is formed without weakening head 54.

The bolt with restrainer 48 is illustrated with a single rivet shank, as compared to the three such rivet shanks shown in the preferred embodiment. In order to prevent the retainer 52 from turning, the rivet shank 56 is non-round. In the illustrated embodiment, it is square and the square lies with its center directly upon the bolt axis. A similar square hole 58 is formed in the flat panel portion of restrainer 52 which overlies the head. The restrainer 52 is installed upon the top of the bolt, with rivet shank 56 through hole 58. Thereupon, the rivet shank 56 is at least in part riveted over so that the restrainer 52 is fixed upon the top of the head. As is illustrated, the four corners 60 of the square rivet shank 56 are riveted over so that metal from the shank overlies the top of the panel portion of restrainer 52.

Again, restrainer 52 is formed with a leg 62 which is spaced from head 54 and extends generally parallel to the bolt shank toward the threaded end thereof. Leg 62 is preferably of curved shape to give it additional strength and, in suitable constructions, to permit it to be inserted in an adjacent hole for preventing rotation of the bolt 50.

Both the preferred embodiment and the additional embodiment have the desirable features of having the restrainer secured to the top of the bolt head so that the bottom of the bolt head directed toward the shank can be properly finished for use in precision applications. Furthermore, both of the embodiments illustrate restrainers which add little height to the bolt head, because the integral rivet shank structure secures the restrainer in firm manner with little height requirement. In addition, in both embodiments the head is not weakened by the drilling of holes or cutting of slots to secure the restrainer onto the bolt head and thus, the bolt has full strength. Also, the restrainer does not occupy any more width than the bolt head, except in the direction in which the leg is positioned. This permits it to be used in close quarters. The preferred embodiment is considered superior to the additional embodiment because the three rivet shanks require less malleable deformation of the head, when the head is formed. Also, positioned as they are, the rivet shanks provide considerable strength bot hin the axial direction of the bolt and in the direction restraining torque is applied by the restrainer onto the bolt, as the bolt is used. The retention of the restrainer in the preferred embodiment is optimized by the positioning of the several rivet shanks, and the described positioning is preferred for this reason.

This invention having been described in its preferred embodiment, it is clear that it is susceptible to numerous modifications and embodiments within the skill of the routine artisan and without the exercise of the inventive

I claim:
1. A bolt assembly comprising:
a bolt having a shank and an enlarged head at one end of said shank, the underside bearing surface of said head being perpendicular to the axis of said bolt, said bolt head having a malleable projection integrally formed with said bolt head and extending away from the top of said bolt head;
and a rigid restrainer having a lateral arm extending away from said bolt axis and provided with a projection receiving opening through which said malleable projection extends and over which said malleable projection is malleably formed to secure fixedly said restrainer to said bolt, said restrainer further having a leg bent away from said arm in a direction substantially parallel to said bolt axis and extending beyond said underside bearing surface of said bolt head.

2. A bolt assembly according to claim 1 wherein said leg of said restrainer is curved about an axis substantially parallel to said bolt axis and in a direction opposite to the curvature of that portion of said shank closest to said leg.

3. A bolt assembly comprising:
a bolt having a shank and an enlarged head at one end of said shank;
and a restrainer secured to the top of said bolt head and having a lateral arm extending away from the axis of said bolt and a leg bent away from said arm in a direction substantially parallel to said bolt axis, said leg being curved about an axis substantially parallel to said bolt axis and in a direction opposite to the curvature of that portion of said shank closest to said leg.

4. A bolt assembly according to claim 3 wherein said lateral arm of said restrainer has a projection receiving opening and said bolt head has a malleable projection integrally formed with said bolt head and extending away from said top of said bolt head through said projection receiving opening, said projection being malleably formed over said lateral arm to secure said restrainer to said bolt.

5. A bolt assembly according to claim 4 wherein said projection and said opening are other than round.

6. A bolt assembly according to claim 4 wherein said bolt head is circular and said restrainer is circular throughout at least half of its circumference, the radii of said bolt head and said circular portion of said restrainer being substantially equal.

7. A bolt assembly according to claim 4 wherein said lateral arm has at least two projeciotn receiving openings and said bolt head has at least two malleable projections.

8. A bolt assembly according to claim 7 wherein said lateral arm has three projection receiving openings located at the corners of an equilateral triangle and said bolt head has three malleable projections located at said corners of said equilateral triangle, said equilateral triangle positioned to surround said bolt axis, one of said projection receiving openings and one of said malleable projections located on the centerline of said lateral arm and the remaining projection receiving openings and malleable projections equally spaced from said centerline on opposite sides of said centerline.

References Cited
UNITED STATES PATENTS

| | | | |
|---|---|---|---|
| 826,584 | 7/1906 | Lehman | 151—33 |
| 1,015,106 | 1/1912 | Weber | 151—68 |
| 1,890,030 | 12/1932 | Edwards | 151—33 |
| 1,985,272 | 12/1934 | Adams | 151—33 |

EDWARD C. ALLEN, *Primary Examiner.*